No. 771,637. PATENTED OCT. 4, 1904.
E. G. HOFFMANN.
UNIVERSAL JOINT OR COUPLING FOR SHAFTING, &c.
APPLICATION FILED OCT. 5, 1903.
NO MODEL. 2 SHEETS—SHEET 1.
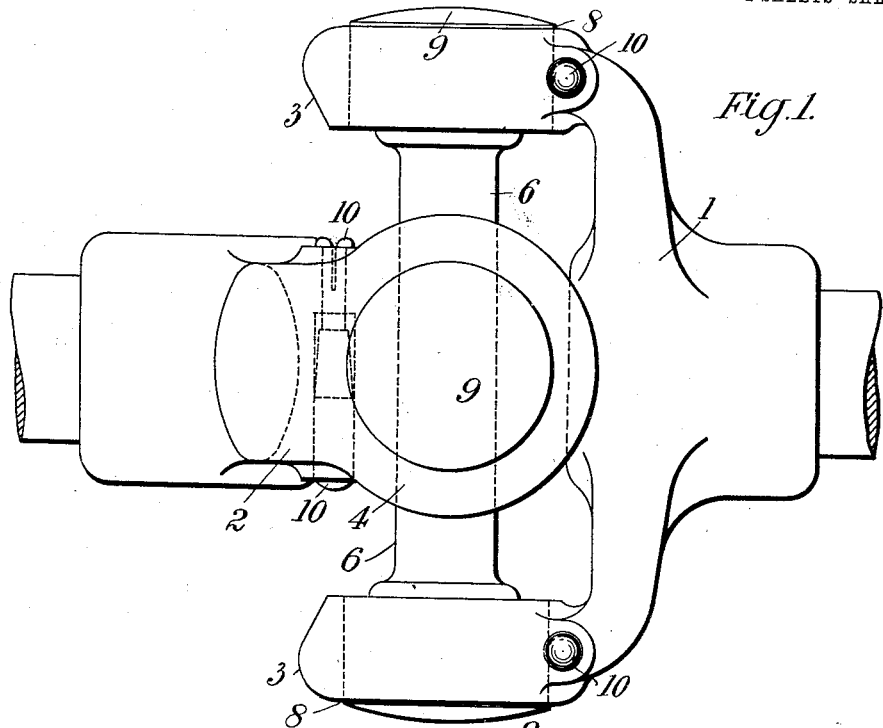
Fig.1.
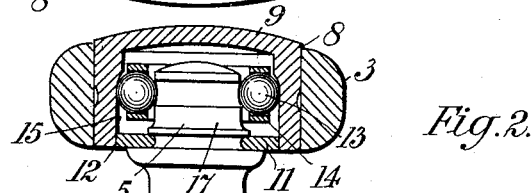
Fig.2.
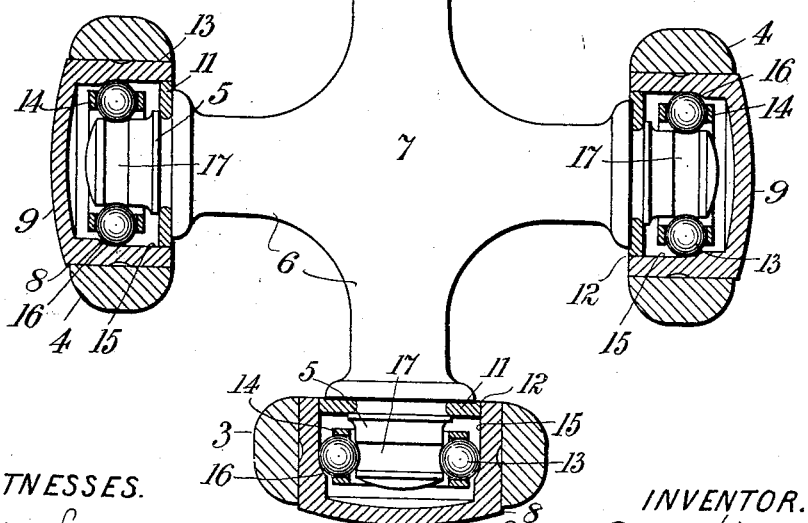
WITNESSES.
Henrietta Lyon.
John M. Scoble.
INVENTOR.
Ernst Gustav Hoffmann
by Redding, Kiddle & Greeley
his Attorneys.

No. 771,637. PATENTED OCT. 4, 1904.
E. G. HOFFMANN.
UNIVERSAL JOINT OR COUPLING FOR SHAFTING, &c.
APPLICATION FILED OCT. 5, 1903.
NO MODEL. 2 SHEETS—SHEET 2.
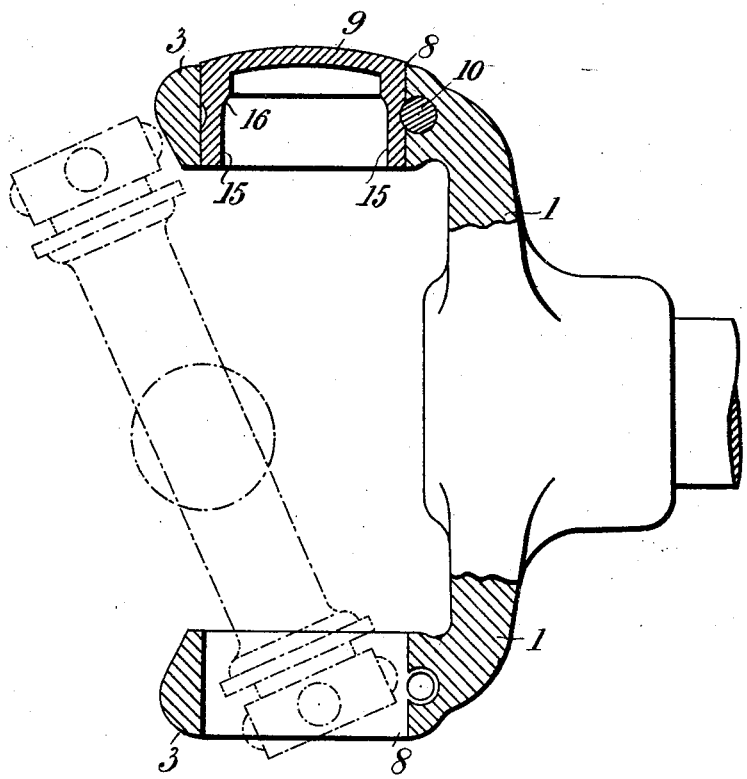
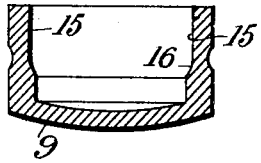
WITNESSES. INVENTOR.

No. 771,637.

Patented October 4, 1904.

UNITED STATES PATENT OFFICE.

ERNST GUSTAV HOFFMANN, OF LONDON, ENGLAND.

UNIVERSAL JOINT OR COUPLING FOR SHAFTING, &c.

SPECIFICATION forming part of Letters Patent No. 771,637, dated October 4, 1904.

Application filed October 5, 1903. Serial No. 175,786. (No model.)

*To all whom it may concern:*

Be it known that I, ERNST GUSTAV HOFFMANN, a subject of His Majesty the German Emperor, residing at London, England, have invented a certain new and useful Improvement in Universal Joints or Couplings for Shafting and the Like, of which the following is a specification.

This invention relates to universal joints or couplings for connecting shafting and other parts with the purpose of allowing the usual variation in alinement, the object in view being to provide a universal joint in which ball-bearings may be employed which is of a simple construction, is easily assembled and taken apart, and in which the bearing parts are carried as far as possible outside of the central line of the two connected parts.

In the accompanying drawings, Figure 1 is an elevation of a coupling in its complete form. Fig. 2 is an elevation of the central part or cross-piece with the bosses of the coupling in section, taken on a line at right angles to Fig. 1. Fig. 3 is a view of the coupling with one cap removed and illustrating the method of assembling or disuniting the parts, and Fig. 4 is a transverse section through one of the caps which inclose the bearings.

Referring to the drawings, it will be seen that the coupling comprises two yoke-pieces 1 and 2, which may be identical in construction, placed at right angles to each other, and carrying on their ends bosses 3 and 4, respectively. The said bosses are open, and into the openings project journals 5, formed on the ends of the arms 6 of a central or cross piece 7, which may be formed by stamping and suitably machining. The openings in the bosses 3 and 4 are of such size that the ends of the arms of the center piece which form the journals can pass clear through same, whereby the center piece 7 can be placed in position between the bosses by suitably tilting it, as shown in Fig. 3. The outside openings 8 of the bosses are adapted to be closed by caps 9, which are held in place by means of keys 10 or by any other suitable means, flexible felt or other suitable washers 11 encircling the said journals serving to close the inside openings 12 to exclude dust.

The balls 13, which form the bearings for the coupling, are preferably held in position in a cage 14, as illustrated in Figs. 2 and 3, and are inserted between the journals 5 of the center piece 7 and the inner walls 15 of the cap, which closes the outside openings of the bosses. The journals, which form the "cone" portion of the bearings, are provided with grooves 17, forming a race for the balls, and the inner walls 15 of the cap, which form the "cup" portion, with a plain cylindrical surface, as shown, forming the other race. Where other forms of caps or other means are used to close the outer openings of the bosses, the balls may be held between the journals and the inside walls of the boss itself, such part, whichever it may be, having upon it an end shoulder 16, forming a continuation of the cylindrical surface 15 to keep the parts in lateral position.

The balls 13 are placed into position in the journals 5, with their cage as shown in Fig. 3, and in this position are sufficiently attached to the journals to enable them to be inserted in position by passing one arm of the cross-piece into the corresponding opening in the boss until it can be brought into line with and inserted into the cap-covered opening of the boss on the opposite side, after which the cap of the first opening is placed in position. It will be seen that it is the cylindrical surface 15 of the caps and the absence of any grooved track therein that enables the movement above described to take place. The center piece can be disconnected by simply withdrawing one of the caps, thus allowing the journal in that boss to be passed into the outside opening, with the result that the journal on the opposite arm will be withdrawn through the inside opening clear of its boss in the opposite manner to that employed for inserting it. It will be understood that where I employ this term "boss" I include any equivalent projection or part carried by a yoke-piece or equivalent holding device, disk, or part.

What I claim is—

1. In a universal joint, and in combination, four bosses, means for carrying said bosses in pairs at right angles to each other, a connecting part located centrally of said bosses, oppositely-arranged journals carried on extremities of said connecting part and balls between said journals and the bosses.

2. In a universal joint, the combination with four similar bosses, suitable yoke-pieces carrying same, a connecting part located centrally of said yoke-pieces, oppositely-arranged journals carried on extremities of said connecting part and balls between the said journals and the bosses.

3. In a universal joint, and in combination, two yoke-pieces placed at right angles to each other, the ends of said yoke-pieces having openings in same, a central connecting-piece, journals carried by said piece within the said openings and balls connecting the journals with said yoke-pieces.

4. In a universal joint, and in combination, four bosses having openings in same, means for carrying said bosses in pairs at right angles to each other, a central piece, portions of which form journals situate within said openings, balls interposed between said journals and inner walls of said openings, and means for retaining the balls and central piece in position.

5. In a universal joint, and in combination four bosses, means for carrying said bosses in pairs at right angles to each other, a central cross-piece the arms of which form journals at the ends situate within said openings, balls interposed between said journaled ends and inner walls of said openings, and cages carrying said balls whereby the latter are held to the journals when the parts are being connected or separated.

6. In a universal joint and in combination four bosses having openings in same, means for carrying said bosses in pairs at right angles to each other, a central cross-piece the arms of which form journals at the ends situate within said openings, means for closing said openings, and balls interposed between said journaled ends and the inner walls of said closing means.

7. In a universal joint and in combination four bosses having openings in same, means for carrying said bosses in pairs at right angles to each other, a central cross-piece the arms of which form journals at the ends and situate within said openings, caps closing said openings having a cylindrical bearing-surface and balls interposed between said journaled ends and the bearing-surface of said cap.

In testimony whereof I have hereunto set my hand in the presence of two subscribing witnesses.

ERNST GUSTAV HOFFMANN.

Witnesses:
ALLEN PARRY JONES,
A. KNIGHT CROAD.